(12) United States Patent
Perkins et al.

(10) Patent No.: US 9,567,068 B2
(45) Date of Patent: Feb. 14, 2017

(54) TORQUE TRANSMISSION IN AN AIRCRAFT DRIVE WHEEL DRIVE SYSTEM

(71) Applicant: Borealis Technical Limited, North Plains, OR (US)

(72) Inventors: Scott Perkins, Kent, WA (US); Shawn M. Green, Alexandria, MN (US); DuWayne R. Cookman, Elbow Lake, MN (US)

(73) Assignee: Borealis Technical Limited, Gibraltar (GI)

( * ) Notice: Subject to any disclaimer, the term of this patent is extended or adjusted under 35 U.S.C. 154(b) by 204 days.

(21) Appl. No.: 14/592,917

(22) Filed: Jan. 9, 2015

(65) Prior Publication Data

US 2016/0200425 A1   Jul. 14, 2016

(51) Int. Cl.
*B64C 25/40*   (2006.01)

(52) U.S. Cl.
CPC .................... *B64C 25/405* (2013.01)

(58) Field of Classification Search
CPC ............... B64C 25/405; B64C 25/40
See application file for complete search history.

(56) References Cited

U.S. PATENT DOCUMENTS

| 3,711,043 A * | 1/1973 | Cameron-Johnson | B64C 25/405 |
| | | | 180/55 |
| 6,657,334 B1 | 12/2003 | Edelson | |
| 6,838,791 B2 | 1/2005 | Edelson | |
| 7,116,019 B2 | 10/2006 | Edelson | |
| 7,445,178 B2 | 11/2008 | McCoskey et al. | |
| 7,469,858 B2 | 12/2008 | Edelson | |
| 7,891,609 B2 | 2/2011 | Cox | |
| 7,975,960 B2 | 7/2011 | Cox | |
| 7,987,960 B2 | 8/2011 | Stoltze | |
| 8,109,463 B2 | 2/2012 | Cox | |
| 8,617,019 B2 * | 12/2013 | Christensen | B64C 25/405 |
| | | | 192/103 R |
| 2006/0273686 A1 | 12/2006 | Edelson et al. | |
| 2015/0097078 A1 * | 4/2015 | Mueller | B64C 25/405 |
| | | | 244/50 |

FOREIGN PATENT DOCUMENTS

GB   2457144 A   8/2009

* cited by examiner

*Primary Examiner* — Tien Dinh
*Assistant Examiner* — Richard R Green

(57) ABSTRACT

A torque transmission system is provided for an aircraft drive wheel drive system mounted on nose or main landing gear wheels to move the aircraft autonomously on the ground that effectively transmits torque through drive system components. The drive system includes a drive means capable of generating sufficient torque to move the aircraft, a drive system capable of generating a high torque capacity that activates the drive means, a clutch assembly that can be selectively engaged to control torque transmission to the drive system and activate the drive means, and a landing gear torque takeout element. The clutch assembly is configured to be inactivated and prevented from transmitting torque to other drive wheel drive system components when an overtorque event occurs. Aircraft drive wheel drive system components in the present torque transmission system are designed to withstand torque in excess of a determined maximum for the system.

19 Claims, 2 Drawing Sheets

TORQUE TRANSMISSION IN AN AIRCRAFT DRIVE WHEEL DRIVE SYSTEM

TECHNICAL FIELD

The present invention relates generally to torque transmission in drive wheels and particularly to torque transmission in an aircraft drive wheel drive system with a clutch controlled drive system-actuated drive means capable of moving an aircraft autonomously during ground operations.

BACKGROUND OF THE INVENTION

As air travel has increased over the past decades, airport facilities have become more crowded and congested. Minimizing the time between the arrival of an aircraft and its departure to maintain an airline's flight schedule, and also to make a gate or parking location available without delay to an incoming aircraft, has become a high priority in the management of airport ground operations. The safe and efficient ground movement of a large number of aircraft simultaneously into and out of ramp and gate areas has become increasingly important. As airline fuel costs and safety concerns and regulations have increased, the airline industry is beginning to acknowledge that continuing to use an aircraft's main engines to move aircraft during ground operations is no longer the best option. The delays, costs, and other challenges to timely and efficient aircraft pushback from airport terminals associated with the use of tugs and tow vehicles make this type of aircraft ground movement an unattractive alternative to the use of an aircraft's main engines to move an aircraft on the ground. Restricted use of an aircraft's engines on low power during arrival at or departure from a gate is an additional, although problematic, option. Not only does such engine use consume fuel, it also burns fuel inefficiently and produces engine exhaust that contains microparticles and other products of incomplete combustion. Operating aircraft engines, moreover, are noisy, and the associated safety hazards of jet blast and engine ingestion in congested gate and ramp areas are significant concerns that cannot be overlooked.

The use of a drive means, such as a motor structure, integrally mounted with a wheel to rotate the wheel of an aircraft has been proposed. The use of such a structure should move an aircraft independently and efficiently on the ground without reliance on the aircraft's main engines. U.S. Pat. No. 7,445,178 to McCoskey et al, for example, describes an aircraft ground movement system with electric nose wheel motors that work in concert with a guidance system intended to move a taxiing aircraft. This system requires ground based and other components external to the aircraft for its operation, however. U.S. Pat. Nos. 7,469,858 to Edelson; U.S. Pat. No. 7,891,609 to Cox; U.S. Pat. No. 7,975,960 to Cox; U.S. Pat. No. 8,109,463 to Cox et al; and British Patent No. 2457144, owned in common with the present invention, describe aircraft drive systems that use electric drive motors to power aircraft wheels and move an aircraft on the ground without reliance on aircraft main engines or external tow vehicles. While the drive means described in these patents can effectively move an aircraft autonomously during ground operations, a system and method of torque transmission through components of a drive system are not suggested. None of the foregoing art, moreover, recognizes the significant improvements in autonomous aircraft ground movement or drive wheel operating efficiency possible when torque is transmitted through a series of drive system components to actuate an aircraft drive wheel system drive means to move the aircraft during ground operations.

The drive means currently proposed for aircraft drive wheel drive systems to drive aircraft autonomously on the ground may rely on gearing systems that operate with the drive means to drive an aircraft wheel and, thus, the aircraft. The replacement of gears by traction drives has been suggested in non-aircraft contexts. Adapting roller or traction drive systems to replace gearing and/or gear systems in aircraft drive wheel drive systems that actuate drive means to independently drive an aircraft drive wheel has not been suggested, however. Additionally, neither providing a clutch assembly to activate such roller traction drive systems nor providing a system for transmitting torque through components of an aircraft drive wheel drive system have been mentioned in the art. While the use of a torque arm assembly in combination with a clutch to provide controlled release of a load is described in U.S. Pat. No. 7,987,960 to Stoltze, this system anticipates load sharing among multiple torque arm assemblies in a backstopping clutch arrangement that is also used to prevent reverse rotation of system components. Such a system would not effectively transfer torque in an aircraft drive wheel drive system, however.

A need exists, therefore, for a system for transferring torque during operation of an aircraft drive wheel drive system that effectively transfers torque through the drive system components when a drive system-actuated drive means is actuated to drive an aircraft drive wheel to move the aircraft autonomously on the ground without reliance on the aircraft's main engines or external ground vehicles.

SUMMARY OF THE INVENTION

It is a primary object of the present invention, therefore, to provide a system for transferring torque during operation of an aircraft drive wheel drive system that effectively transfers torque through the drive system components when a drive system-actuated drive means is actuated to drive an aircraft drive wheel to move the aircraft autonomously on the ground without reliance on the aircraft's main engines or external ground vehicles.

It is another object of the present invention to provide an arrangement of aircraft drive wheel drive system components designed to be integrated with an aircraft drive wheel to effectively transfer torque produced during operation of the system to drive the aircraft wheel and, therefore, the aircraft, independently during ground operations.

It is an additional object of the present invention to provide a torque transmission system for an aircraft drive wheel driven by a drive system that includes a drive means actuated by a torque reactive traction speed change device which is activated by a clutch assembly to move an aircraft autonomously on the ground.

It is a further object of the present invention to provide a torque transmission system for an aircraft drive wheel drive system designed to withstanding torque in excess of the maximum expected system torque and to become inactivated when an overtorque event occurs.

It is yet another object of the present invention to provide a torque transmission system for an aircraft drive wheel drive system that directs torque through system components to a torque takeout element.

It is yet an additional object of the present invention to provide a torque transmission system for an aircraft drive wheel drive system that directs torque through system components to a torque takeout arm formed by a modified aircraft landing gear tow lug or tow hitch.

It is a still further object of the present invention to provide a torque transmission system for an aircraft drive wheel drive system that includes a clutch assembly designed to be inactivated, thereby inactivating the drive wheel drive system, in the event of an overtorque occurrence.

In accordance with the aforesaid objects, a torque transmission system is provided for an aircraft drive wheel drive system that effectively directs torque generated during operation of the drive system to move an aircraft autonomously on the ground through system components to a torque takeout element. The drive wheel drive system may be mounted on one or more nose or main landing gear wheels. The system includes a drive means capable of generating sufficient torque to move an aircraft nose or main wheel to move the aircraft, a drive system capable of generating a high torque capacity for its size and weight that actuates the drive means, and a clutch assembly that can be selectively engaged and disengaged to control torque transmission to the drive system and, therefore, selectively actuate the drive means. A landing gear tow lug, tow hitch, or other suitable landing gear structure may be modified to function as a torque takeout element to receive excess torque from the torque transmission system. The system clutch assembly may be configured to be inactivated when an overtorque event occurs. The aircraft drive wheel drive system is preferably designed to withstand torque in excess of an expected maximum torque.

Other objects and advantages will be apparent from the following description, claims, and drawings.

DESCRIPTION OF THE INVENTION

The benefits of being able to efficiently and safely move an aircraft during ground operations without reliance on the aircraft's main engines or external tow vehicles have long been recognized. Actually achieving these benefits, however, has proved challenging. Applicant's previously proposed aircraft wheel drive means have been demonstrated to effectively power drive wheels and move aircraft on the ground without reliance on aircraft engines or tow vehicles and, thus, can enable aircraft operators to achieve the advantages of autonomous ground movement. The present invention improves the capabilities of Applicant's original aircraft drive wheel drive system and expands the advantages possible when aircraft can be driven during ground operations by controllable onboard drive means independently of the aircraft's main engines and external ground vehicles. These advantages and improvements are achieved, in large part, by the design of an aircraft drive wheel drive system, which incorporates a clutch assembly-activated drive system to control operation of the drive means and arranges these components to transfer torque effectively through the drive system so that excess torque is transmitted outside the system. Additionally, the system is also designed to be inactivated in the event of an overtorque occurrence.

Figure 1:
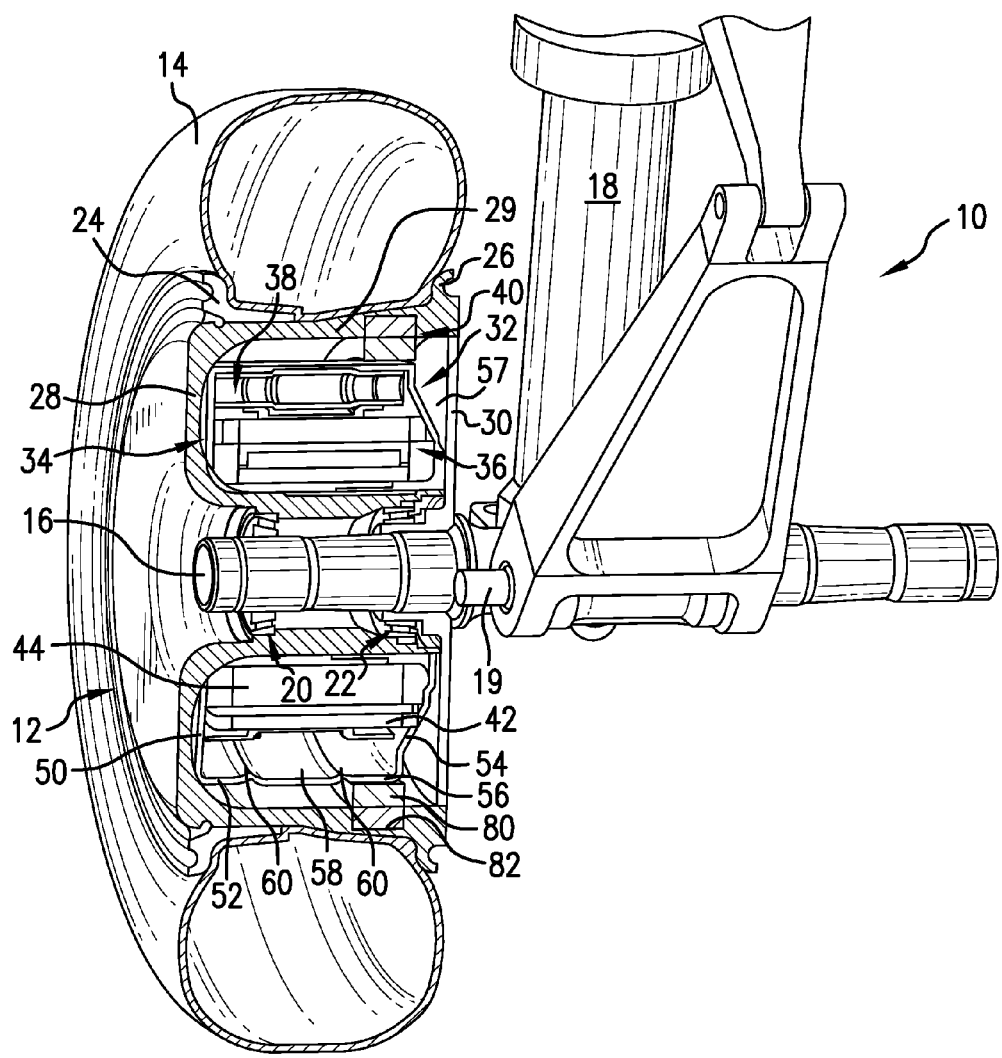
FIG. 1 is a cross-sectional perspective schematic view of a portion of an aircraft landing gear and a landing gear drive wheel showing an aircraft drive wheel drive system and the torque transmission system of the present invention.

Referring to the drawings, FIG. 1 shows, in cross-sectional perspective view, a portion of an aircraft landing gear 10 and a landing gear wheel 12 with an aircraft drive wheel drive system mounted within the landing gear wheel. Although only one landing gear wheel is shown in detail, it is contemplated that one or more nose landing gear wheels, one or more main landing gear wheels, or a combination of nose and main landing gear wheels could be equipped with drive wheel drive systems and torque transfer systems as described herein. In one possible arrangement, for example, equipping both wheels in a two wheel nose landing gear with an aircraft drive wheel drive system as described herein provides the capability not only to effectively move the aircraft autonomously on the ground, but also to achieve effective torque transfer through the drive system and drive wheel. Further, selective activation of the drive means in each wheel may be employed to differentially steer and brake the aircraft.

A tire 14 is shown mounted on the wheel 12. The wheel 12 and tire 14 are rotatably mounted on an axle 16 attached to the landing gear 10. The landing gear 10 includes a central piston 18 and other standard landing gear structures (not identified) typically found in an aircraft nose or main wheel landing gear. This usually includes one or more elements 19, for example a tow lug or tow hitch, which are provided to enable attachment of the landing gear to an external tow vehicle required to move an aircraft that is not equipped with the drive wheels described herein. The wheel 12 is rotatably supported on the axle 16 by support structures, such as by the bearing arrangements 20 and 22 shown adjacent to the axle 16. Other suitable support structures or bearings could also be used for this purpose. The wheel 12 preferably has the two part configuration shown in FIG. 1, although other wheel designs could also be employed.

Removal and remounting of the tire 12 is facilitated by providing a demountable tire flange 24, preferably on an outboard side of the wheel 12, so that it can be removed when necessary. A stationary tire flange 26 is provided to hold an opposite side of the tire 14. The stationary tire flange is preferably integrally formed with an upper portion 29 of a substantially "C"-shaped outboard wheel wall section 28 that forms most of the wheel. A smaller inboard wheel wall section 30 connects to the outboard wheel section 28 to define a maximum space or volume within the wheel 12 where components of a drive wheel drive system can be mounted. To provide a clearer view of the main components of a preferred aircraft drive wheel system, elements, such as, for example, the tire valve stem, are not shown.

Figure 2:
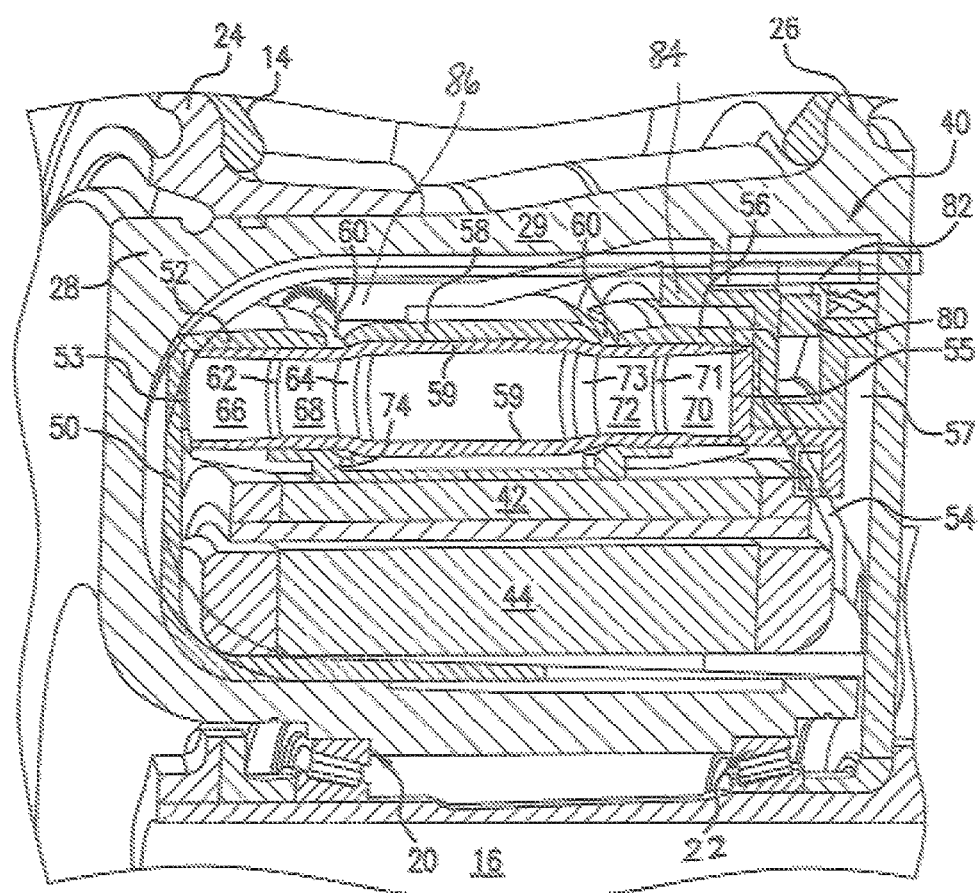
FIG. 2 is a diagrammatic view of a portion of the aircraft landing gear drive wheel of FIG. 1, showing the relative locations of the drive wheel drive system components, including a drive means, a drive system, a clutch assembly, and a torque takeout element within a space in the wheel defined to hold these system components.

A preferred torque transfer system configuration and arrangement of components of a preferred drive wheel drive system 32 is shown in FIGS. 1 and 2. Other functionally equivalent arrangements and configurations capable of effectively transferring torque are also contemplated to be within the scope of the present invention. In the preferred configuration shown, the components of the drive system 32 may be enclosed within a system housing 34 that is shaped to fit completely within the space created by the arrangement of the respective outboard and inboard wall sections 28 and 30 of the wheel 12. The main elements of the drive wheel drive system include a drive means 36, a drive system 38, and a clutch assembly 40, are in torque transfer relationship, preferably positioned as shown in FIGS. 1 and 2, although other functionally suitable positions and locations could also be used. In the preferred arrangement shown, the components of the drive means 36 and the drive system 38 are not centered within the wheel space, but may be positioned within the system housing 34 so that the outboard edges of these structures are in substantially parallel alignment with the outboard wheel wall 28. As a result, the system housing 34 has the asymmetrical configuration shown.

A preferred drive means 36 includes a rotating element, such as a rotor 42, and a stationary element, such as a stator 44. The rotor 42 is preferably located externally of the stator 44, as shown, but other drive means component arrangements could also be used and are contemplated to be within the scope of the present invention. For example, the positions of the rotor 42 and stator 44 could be reversed so that the rotor is internal to the stator.

A drive means 36 preferred for use with the aircraft drive wheel drive system of the present invention is an electric motor assembly that is capable of operating at the torque and speed required to move an aircraft wheel and, therefore, an aircraft during ground operations. An example of one of a number of suitable types of drive means useful in an aircraft drive wheel drive system that could be used effectively in the present system is an inside-out electric motor in which the rotor can be internal to or external to the stator, such as that shown and described in U.S. Patent Application Publication No. US2006/0273686, the disclosure of which is incorporated herein by reference. A range of motor designs capable of high torque operation across a desired speed range that can move an aircraft wheel and function as described herein may also be suitable drive means in a drive wheel drive system employed with the present torque transmission system. A high phase order electric motor of the kind described in, for example, U.S. Pat. Nos. 6,657,334; 6,838,791; 7,116,019; and 7,469,858, the disclosures of the aforementioned patents being incorporated herein by reference, may be effectively used as a drive means 36. One particularly suitable drive means 36 is a high phase order induction motor with a top tangential speed of about 15,000 linear feet per minute and a maximum rotor speed of about 7200 rpm, although drive means capable of a wide range of such speeds could be used with the present torque transmission system. Other drive means, including hydraulic and/or pneumatic drive means, are also contemplated to be useful as drive means with the present invention.

The system housing 34 is specifically designed to operatively enclose the drive means 36 and the drive system 38, as well as to operatively support the clutch assembly 40 as it is controlled to engage and disengage the drive system 38. FIG. 2 shows the clutch assembly 40 and other structures of the drive system 36 in greater detail than they appear in FIG. 1. The system housing 34 encloses and/or supports the aircraft drive wheel drive system components completely within the space available in an aircraft drive wheel so that these components are in torque transfer relationship. A preferred system housing 34, shown in FIGS. 1 and 2, may be formed in sections and may include an outboard section 50 that extends from the stationary element 44 of the drive means parallel to the wheel wall 28 toward the wheel section 29 to form an outboard lip 52 that contacts and wraps around an outboard end 53 of the drive system 38. An inboard section 54 of the motor housing 34 may be angled from the stationary element 44 toward the horizontal wheel section 29 to form an inboard lip 56 that contacts and wraps around an inboard end 55 of the drive system 38. The inboard lip 56 is interposed between an outer surface of the drive system inboard end 55 and the clutch assembly 40. A circumferential central system housing section 58 may be disposed between the housing outboard lip 52 and inboard lip 56 to contact a surface of a roller box 59 supporting the drive system 38, which is preferably a roller traction drive system. This preferred three-part arrangement of the system housing can be seen more clearly in the lower part of FIG. 1.

The drive system 38, which is shown positioned between the drive means 36 and the system housing sections 52, 56, and 58, is not shown in the lower part of the wheel 12 in FIG. 1, providing a clearer view of the system housing sections. It will be noted that circumferential gaps 60 are provided between the central circumferential section 58 and the outboard and inboard lip portions 52 and 56 of the system housing to permit thermal expansion of housing sections during operation.

As discussed above, the inboard section 54 of the system housing is angled to correspond to the asymmetric shape of the nonparallel inboard edges of the drive means elements 42 and 44 and the drive system 38, which provides an inboard recess 57 between the system housing wall 54 and the inboard wheel wall 30. The recess 57 may provide space to accommodate components of the clutch assembly 40. The inboard system housing section 54 and recess 57 could also direct and receive wiring (not shown) from the drive means elements, sensors, and/or other components that must be attached to wiring. This wiring may be a wire harness or other convenient wiring arrangement that ultimately connects the drive wheel components to the aircraft electrical system and/or a source of electrical power. Other housing configurations that functionally accommodate the drive system components in torque transfer relationship may also be used and are contemplated to be within the scope of the present invention.

The drive system 38 is a system that performs essentially the same functions that would be performed by gearing or a gear system. The replacement of gearing by a drive system, particularly by a preferred roller traction drive system, in an aircraft drive wheel drive system presents many advantages. A roller traction drive system designed to actuate and transmit torque to a drive means capable of moving a commercial sized aircraft on the ground not only has a low profile and is light weight, but also provides the high torque and high speed change ratio required to optimally operate the drive means to optimally operate the drive means and move an aircraft on the ground. Unlike a gear system, a roller traction drive system has substantially zero backlash and can be made of dry running components that do not require lubrication. Planetary and other gear systems are capable of only limited gear ratios, while an infinite gear ratio is possible with a preferred roller traction drive system. A preferred roller traction drive system may, in addition, be self-energizing. Other advantages of integrating a roller traction drive system in a torque transmission system with an aircraft drive wheel drive means to drive an aircraft wheel and move an aircraft on the ground may also be realized.

One type of roller traction drive system 38 particularly preferred for use in the aircraft drive wheel system of the present invention may employ a series of rollers, preferably arranged in two rows and positioned within opposed motive surfaces or "races," (62, 64, 71, and 73 in FIG. 2) so that a respective inner or outer row of rollers contacts an inner or outer race. The rollers, which are preferably hollow cylinders, contact the motive surfaces with pure rolling contact and low friction and, therefore, are highly efficient. Rollers have been found to function more efficiently than balls in a drive structure, such as the present drive system 38, although drive systems that employ balls are also contemplated to be within the scope of the present invention. Rollers, particularly hollow cylindrical rollers, do not demonstrate the high levels of friction and/or wear that characterizes gears typically used to drive a motor or other drive means. In addition, traction and rigidity of a roller traction drive system may be varied as the number of rollers in a roller traction drive is varied, with increased numbers of rollers increasing traction and rigidity. A range of different configurations of roller traction drive systems and other drive systems that satisfy the parameters described above could be used to actuate a drive means in an aircraft drive wheel to move the aircraft effectively and efficiently during ground operations.

One particularly preferred drive system is a torque reactive traction drive speed change device that may include two rows of outer rollers 66 and 68 positioned to contact the races 62 and 64 and two rows of inner rollers 70 and 72 positioned to contact the races 71 and 73. This arrangement produces less torque than a geared speed change device of the same size, but has a high torque capacity for its size and weight. A support element 74 supports the roller box 59 in contact with the drive means rotor element 42 to enable torque transmission from roller traction drive system 38 to the drive means 36.

The clutch assembly 40 of the present invention may be activated automatically or manually to engage and disengage the drive system 38 into and out of actuation with the drive means 36. Actuation of the drive means transfers torque to move the aircraft wheel and drive the aircraft on the ground or, when appropriate, de-actuation of the drive means prevents torque transfer, and the drive means is unable to drive the aircraft wheel. The drive system should only be engaged by the clutch assembly to actuate the drive means when the aircraft is actually on the ground, such as after landing and prior to takeoff, and when the aircraft is traveling at a desired speed during ground travel. Engagement and disengagement of the clutch assembly 40 could be targeted to the speed or torque of the aircraft wheel 12 and/or to speeds or torques of drive wheel system components, including the speed or torque of the drive system 38.

The clutch assembly 40 is preferably located in an inboard portion of an aircraft wheel, such as within the recess 57 adjacent to the system housing inboard lip section 56 as shown schematically in FIG. 1 and in more detail in FIG. 2. A circumferential clutch assembly recess 82, configured to receive a correspondingly configured circumferential clutch component 80, may be provided in the wheel section 29. This arrangement enables the circumferential clutch component 80 to be press fit into the recess 82 if needed to ensure disengagement of the clutch assembly, such as when an overtorque event occurs. In this event, any shocks above a selected torque load maximum level cause the circumferential clutch component 80 to be pushed into the recess 82 so that the clutch assembly cannot engage the drive system 38 and torque cannot be transmitted through the drive wheel drive system. A clutch release mechanism (not shown) may be included to release the clutch circumferential member 80 from the recess 82 when torque on the clutch or on the system drops to an acceptable level.

The clutch assembly shown in FIG. 2 includes a housing member 84 adjacent to the recess 82, preferably positioned between the inboard wheel wall 30 and the drive system housing inboard wall 54 to enclose and support the circumferential clutch component 80 and/or other clutch elements. The clutch assembly housing member 84 is designed to include an extension 86 in contact with the system housing central section 58, which may be adjacent to the drive system 38 output surface 59. The clutch assembly 40 is preferably operably positioned to move into and out of engagement with the drive system 38 output surface 59, so that torque may be selectively transmitted between the clutch and the drive system.

Any suitable circumferential type of clutch assembly that can function as described herein to engage or disengage a drive system to activate such a system to transmit torque through an aircraft drive wheel drive system may be used in connection with the present invention. One preferred type of clutch uses an arrangement of sprags or pawls to provide a mechanism for engaging a drive system to a wheel and disengaging a drive system from a wheel so that the transmission of torque may be permitted or prevented through the drive system, the drive means, and the driven aircraft wheel, depending on whether the clutch is engaged or disengaged.

The components of the aircraft drive wheel drive system described herein are preferably designed to withstand high torque loads, preferably torque loads in excess of a maximum torque load determined for the system in operation. In the event that the torque generated by operation of the aircraft drive wheel or any of the drive system components exceeds this determined maximum torque, excess torque is preferably directed through the system. Torque transmission may be directed from the outboard side of the wheel, through the wheel drive system components, to the inboard side of the wheel to a torque takeout element, such as the tow lug structure 19, preferably mounted near the drive wheel on a stationary landing gear structure. As noted above, the drive system clutch assembly 40 is also designed to react to an excess torque situation or an overtorque event and may be press fitted into the aircraft wheel section 29 to ensure that the drive system 38 cannot be engaged when the torque level is higher than the optimum torque determined for the system.

Torque to rotate an aircraft wheel may be produced by a drive means when power is supplied to the drive means. In the case of an electric drive means, electric current to power the drive means is preferably provided by the aircraft's auxiliary power unit (APU), but could be supplied by another power source. Rotation of the drive means 36 rotating element, such as the rotor 42, transmits torque to and causes the aircraft wheel 12 to rotate about the axle 16, moving the aircraft in the desired direction of rotation. Torque transmission may be affected by the interaction between the drive system 38 and the drive means 36 and by the interaction between the drive system 38 and the clutch assembly 40. The drive system 38 may change the speed of the drive means 36 in response to the torque of the drive means and actuate or de-actuate the operation of the drive means accordingly. The clutch assembly 40, which preferably includes an attachment to the aircraft drive wheel 12, may activate or de-activate operation of the drive means in response to wheel torque.

Although not shown, it is anticipated that torque and/or speed sensors and suitable microprocessors and/or software may be included in the present torque transmission system. This will facilitate the automatic transmission of torque through the components of the aircraft drive wheel drive system, as well as providing an automatic or manual override to prevent torque transmission through the system, if necessary or conditions warrant.

While the present invention has been described with respect to preferred embodiments, this is not intended to be limiting, and other arrangements and structures that perform the required functions are contemplated to be within the scope of the present invention.

INDUSTRIAL APPLICABILITY

The present invention will be most useful for ensuring optimum torque transmission through the components of an aircraft drive wheel drive system to move an aircraft autonomously on the ground and will find its primary applicability where it is desired to optimize torque transfer through an aircraft drive wheel drive system to realize the benefits of moving an aircraft very efficiently on the ground without reliance on the aircraft's main engines or external ground vehicles.

The invention claimed is:

1. A torque transmission system for an aircraft drive wheel drive system designed to efficiently move an aircraft autonomously during ground operations comprising:
   a. at least one wheel rotatably mounted on an aircraft landing gear controllable to generate sufficient torque to move an aircraft autonomously during ground travel without reliance on aircraft engines or external tow vehicles;
   b. at least one wheel drive system mounted completely within said wheel operably connected to said wheel to control rotation of said wheel and generate a torque required to drive said wheel and move said aircraft, wherein said wheel drive system comprises drive means in driving contact with said wheel for generating a determined maximum system operating torque to power rotation of said wheel at a desired speed and torque to move said aircraft; a drive system in actuating and torque transfer contact with said drive means; and a selectively engageable and disengageable clutch supported within said wheel at a location in selectively activating torque transmission contact with said drive system, and
   c. a torque takeout element mounted on a stationary aircraft landing gear component in torque transmission relationship with said wheel drive system to receive torque in excess of said determined maximum system operating torque.

2. The torque transmission system of claim 1, wherein said torque takeout element comprises a tow lug or tow hitch modified to receive said torque in excess of said determined maximum system operating torque.

3. The torque transmission system of claim 1, wherein said wheel is adapted to receive said clutch and to hold said clutch out of torque transmission relationship with said drive system.

4. The torque transmission system of claim 3, wherein said wheel comprises a clutch-receiving recess configured to receive and hold said clutch out of actuation and torque transfer contact with said drive system.

5. The torque transmission system of claim 1, wherein said drive means comprises a rotating element and a stationary element selectively connected between a supply of torque generating power and said wheel.

6. The torque transmission system of claim 5, wherein said drive means comprises an electric motor, said rotating element comprises a rotor, and said stationary element comprises a stator.

7. The torque transmission system of claim 1, wherein said drive system comprises a roller traction drive system.

8. The torque transmission system of claim 7, wherein said roller traction drive system comprises a first surface located to be in torque transmitting contact with said clutch and a second surface located to be in torque transmitting contact with said drive means, and said roller traction drive system further comprises a plurality of rollers disposed between inner and outer races and positioned to transfer torque between said first surface and said second surface.

9. The torque transmission system of claim 1, wherein said torque transmission system is sized and shaped to fit completely within a volume of an aircraft nose or main landing gear wheel.

10. The torque transmission system of claim 1, wherein said wheel drive system components are located to transmit torque through said system from an outboard side of said wheel to an inboard side of said wheel to said torque takeout element.

11. The torque transmission system of claim 10, wherein said torque takeout element comprises a torque takeout arm comprising a modified tow hitch.

12. The torque transmission system of claim 1, wherein said wheel, said drive means, said drive system, and said clutch are all designed to transmit a level of torque in excess of said determined maximum system operating torque.

13. The torque transmission system of claim 1, further comprising sensor means for monitoring levels of torque transmitted through said system and processor means for automatically preventing torque transmission when torque in excess of said determined maximum system operating torque is detected.

14. A method for torque transmission system through an aircraft drive wheel drive system designed to efficiently move an aircraft autonomously during ground operations comprising:
   a. providing at least one wheel rotatably mounted on an aircraft nose or main landing gear controllable to generate sufficient torque to move an aircraft autonomously during ground travel without reliance on aircraft engines or external tow vehicles;
   b. providing at least one wheel drive system comprising drive means, a drive system adapted to actuate said drive means, and a clutch adapted to selectively engage said drive system and mounting said wheel drive system completely within said wheel to transmit a determined maximum system operating torque to said wheel to control rotation of said wheel and generate a torque required to drive said wheel and move said aircraft;
   c. controlling said wheel drive system to selectively engage said clutch to activate and transmit torque to said drive system, wherein said activated drive system actuates and transfers torque to said drive means, and said actuated drive means transfers torque to said wheel and powers rotation of said wheel at a desired speed and torque to move said aircraft autonomously on a ground surface; and
   d. providing a torque takeout element mounted on a stationary aircraft landing gear component in torque transmission relationship with said wheel drive system on said landing gear, and transmitting torque in excess of said maximum system operating torque through said wheel drive system to said torque takeout element.

15. The method of claim 14, further comprising selectively disengaging said clutch out of torque transmission with said drive system in the event of an overtorque event.

16. The method of claim 14, further comprising providing a drive system comprising a roller traction drive system with a first surface located to be in torque transmitting contact with said clutch and a second surface located to be in torque transmitting contact with said drive means, and a plurality of torque transmitting rollers disposed between inner and outer races to transmit torque from said first surface and said second surface.

17. The method of claim 14, further comprising transmitting torque through said wheel drive system from an outboard side of said wheel to an inboard side of said wheel to transmit torque in excess of the determined maximum system operating torque to said torque takeout element.

18. The method of claim 15, further comprising providing clutch retaining structure in said wheel to hold said clutch out of torque transmission contact with said drive system and, in the event of the overtorque event, preventing torque transfer through said wheel drive system when said clutch is held in said clutch retaining structure.

19. The method of claim 14, further comprising monitoring levels of torque transmitted through said wheel drive system, and automatically preventing torque transmission through said wheel drive system when torque in excess of the determined maximum system operating torque is detected.

* * * * *